United States Patent [19]

Tutin

[11] Patent Number: 5,710,239
[45] Date of Patent: Jan. 20, 1998

[54] WATER-SOLUBLE SULFONATED MELAMINE-FORMALDEHYDE RESINS

[75] Inventor: Kim K. Tutin, Renton, Wash.

[73] Assignee: Georgia-Pacific Resins, Inc., Atlanta, Ga.

[21] Appl. No.: 609,064

[22] Filed: Feb. 29, 1996

[51] Int. Cl.$^6$ .................................... C08G 12/30
[52] U.S. Cl. .................... 528/254; 528/261; 528/262; 528/423; 528/487; 528/495; 528/503; 524/247; 524/249; 524/428; 524/430; 524/593; 524/597; 524/843
[58] Field of Search .................... 528/254, 261, 528/262, 423, 487, 295, 503; 524/593, 597, 843, 247, 249, 478, 430

[56] References Cited

U.S. PATENT DOCUMENTS

| | | |
|---|---|---|
| 2,407,599 | 9/1946 | Auten et al. . |
| 2,603,623 | 7/1952 | Bonzagni . |
| 2,730,516 | 1/1956 | Suen et al. . |
| 2,863,842 | 12/1958 | Bonzagni . |
| 2,978,359 | 4/1961 | Wedell . |
| 3,479,247 | 11/1969 | Bonzagni . |
| 3,501,429 | 3/1970 | Bonzagni . |
| 3,870,671 | 3/1975 | Aignesberger et al. . |
| 3,941,734 | 3/1976 | Aignesberger et al. . |
| 4,403,993 | 9/1983 | Lach et al. . |
| 4,501,839 | 2/1985 | Bürge et al. ............. 524/247 |
| 4,677,159 | 6/1987 | Lahalih et al. . |
| 4,810,252 | 3/1989 | Becker et al. . |
| 4,820,766 | 4/1989 | Lahalih et al. . |
| 5,071,945 | 12/1991 | Weichmann et al. . |
| 5,424,390 | 6/1995 | Dupuis et al. . |

*Primary Examiner*—Samuel A. Acquah
*Assistant Examiner*—Khoi Truong
*Attorney, Agent, or Firm*—Banner & Witcoff, Ltd.

[57] ABSTRACT

The present invention relates to a sulfonated water-soluble melamine-formaldehyde resin, to a method of manufacturing the resin, and to insulation products prepared using the resin. The resin is particularly useful for making thermal insulation having low moisture adsorption, high tensile strength and low formaldehyde emissions.

20 Claims, 3 Drawing Sheets

% Moisture Absorption Verses Mole Ratio of Sulfite/Melamine $y=0.102x+0.0338$
$R^2=0.9689$ ♦ % Moisture Absorption
— Linear (% Moisture Absorption)

WATER-SOLUBLE SULFONATED MELAMINE-FORMALDEHYDE RESINS

FIELD OF INVENTION

The present invention relates to a water-soluble, sulfonated melamine-formaldehyde resin, to methods of manufacturing the resin, and to products prepared using the resin. More particularly, the invention relates to a water-soluble, sulfonated melamine-formaldehyde resin which, when cured, exhibits low formaldehyde emissions. The resin, when used in thermal insulation for example, provides a product with a low moisture adsorption and a high tensile strength.

BACKGROUND OF INVENTION

It is known in the art to produce water-soluble melamine-formaldehyde resins using a condensation reaction; however, these resins have a drawback of producing modest to high amounts of free formaldehyde. Such resins have been used as casting resins, as adhesives, and as textile finishing agents. The introduction of a sulfonic group is known to improve certain physical and chemical properties of the resinous condensation products; however, the properties of such modified resins are not sufficiently improved with respect to some fields of application such as thermal insulation.

U.S. Pat. No. 2,978,359 describes sulfonated melamine-formaldehyde resins. However, these resins provide undesired amounts of formaldehyde emissions due to a high mole ratio of formaldehyde to melamine. Further, the moisture adsorption characteristics of the resins are not ideal for thermal insulation use.

U.S. Pat. No. 2,603,623 is directed to melamine-formaldehyde resins which have been etherified with lower aliphatic monohydric and dihydric alcohols, such as methanol, in an alkaline solution in the presence of a small proportion of an alkali metal salt of sulfurous acid, such as alkali metal sulfites, bisulfites, and metabisulfites. However, the alcohols volatilize during cure, and are thus considered volatile organic compounds (VOCs). Elimination of such VOCs is greatly desired.

U.S. Pat. No. 2,863,842 is directed to producing melamine-formaldehyde resins with sodium bisulfite, for example, under alkaline conditions using sodium hydroxide. These resins gel in solution if more than 10% solids are present. Further, this patent requires an acid polymerization step which, on neutralization, increases the total salt content of the resin making the resin unsuitable for use when preparing insulation.

U.S. Pat. No. 5,071,945, describes a process of making sulfonic acid group-containing condensation products as additives for hydraulic building material such as mortar, cement and gypsum. This patent also requires an acid polymerization step, again making the products unsuitable for insulation purposes.

None of the prior art describes a sulfonated melamine-formaldehyde product made using both a low F/M mole ratio and a low mole ratio of sulfite/melamine which remains stable as an aqueous solution. Furthermore, melamine-formaldehyde resins having acceptable properties for producing thermal insulation, such as an acceptable level of free-formaldehyde, and a low moisture absorption are not widely available.

SUMMARY OF THE INVENTION

The present invention is directed to a water-soluble sulfonated melamine-formaldehyde resin which has low formaldehyde emissions during and post-cure. The invention is more particularly directed to a melamine-formaldehyde resin chemically stabilized with sodium bisulfite or metabisulfite and a polyhydroxy compound, such as sucrose or sorbitol.

The resin, in accordance with the present invention, is prepared by reacting melamine and formaldehyde at an initial F/M mole ratio of about 2.0 to 3.0 in the presence of a polyhydroxy compound and under an alkaline condition to form an initial melamine-formaldehyde resin. Thereafter, the initial resin is sulfonated with sodium bisulfite or a metabisulfite. The sulfite is added in an amount to provide a bisulfite/melamine mole ratio of about 0.05 to 1.5. The sulfonated melamine-formaldehyde resin is then polymerized by heating the resin to enhance its storage stability. Thereafter, additional melamine is added to the resin to reduce the cumulative F/M mole ratio to about 1.6 to 1.7. The pH of the final sulfonated melamine-formaldehyde resin is then adjusted, if necessary, to about 9.0 to 10.0, and the resin is ready for storage or use.

The present invention is also directed to thermal insulation prepared with a sulfonated, water-soluble melamine-formaldehyde resin, as described above.

The resulting resin remains completely water-soluble and liquid at room temperature for more than 50 days. The resin has excellent water solubility characteristics and a low molecular weight and a low viscosity, making it easy to pump and handle.

The low F/M mole ratio of the final resin lowers formaldehyde emissions and reduces the final free formaldehyde content of the resin. The low mole ratio of bisulfite/melamine decreases the resin's moisture absorption characteristics and improves its wet tensile strength when the resin is used, for example, in thermal insulation. The resin of the present invention is substantially free of volatile organic carbons (VOCs) since it does not require any alcohols which are volatilized during cure and thus considered VOCs. Further, the resin of the present invention does not use an acid polymerization step which contributes to an increase the total salt content of the resin and, therefore, increases the resin's moisture absorption characteristics.

It is to be understood that both the foregoing general description and the following detailed description are exemplary and explanatory only and are not restrictive of the present invention as claimed.

DETAILED DESCRIPTION OF THE INVENTION

Figure 1:
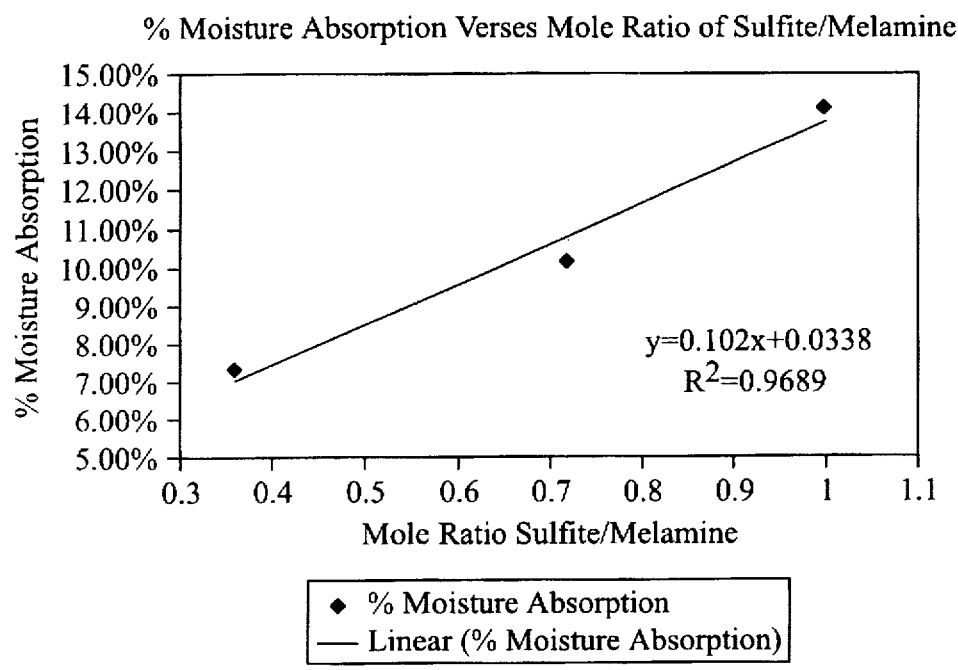
FIG. 1 depicts % moisture absorption vs mole ratio of sulfite/melamine results.

The present invention is directed to a water-soluble, sulfonated melamine-formaldehyde resin. The resin is prepared with and stabilized by sodium bisulfite or metabisulfite and a polyhydroxy compound.

The sulfonated melamine-formaldehyde resin is prepared by reacting a mixture of melamine and formaldehyde at an initial F/M mole ratio of about 2.0 to 3.0, preferably about 2.3 to 2.7, and more preferably about 2.5, in the presence of a polyhydroxy compound and under an alkaline condition to form an initial melamine-formaldehyde resin.

The alkaline condition is generally a pH of about 8.8 to 11.0, preferably about 10.0. While a higher pH could be used, it should be avoided because it increases the resin's salt content. The polyhydroxy compound is preferably sucrose or sorbitol. Other polyhydroxy compounds such as disaccharides, dextrin, corn syrup, starch hydrolyzates, and glycerin may also be used. A sufficient amount of the polyhydroxy compound is used to stabilize and increase the water solubility of the final resin. Preferably, the polyhydroxy/melamine mole ratio is about 0.06 to 0.18 based on the total amount of melamine. More preferably, the ratio is about 0.10 to 0.12.

In order to accelerate the reaction, the mixture is heated to about 75° to 100° C., preferably about 85° to 95° C., and most preferably about 90° C., and held for a time sufficient for the formaldehyde to methylolate the melamine. Typically, the reaction time is between about 15 to 60 minutes and usually about 30 minutes. The mixture is then cooled to about 70° to 80° C., more preferably to about 74° to 76° C.

Thereafter, the initial resin is sulfonated by adding sodium bisulfite or metabisulfite to the initial resin. The sodium bisulfite or metabisulfite is added until a bisulfite/melamine mole ratio of about 0.05 to 1.5 based on the total amount of melamine, is reached. Preferably this ratio is about 0.15 to 1.0, more preferably about 0.15 to 0.8, even more preferably about 0.15 to 0.25, and most preferably about 0.21. The temperature of the mixture is maintained between about 70° and 80° C. for a time sufficient to sulfonate the melamine. Sulfonation of the melamine usually takes about 2 hours.

The temperature of the sulfonated melamine-formaldehyde mixture is then raised to about 75° to 95° C., preferably about 85° to 95° C., and, more preferably, about 90° C. The resin is polymerized in order to avoid instability due to gelling of the polymer during storage. A suitable time for the polymerization step can be determined by routine experimentation. See Example 6 and FIG. 4 for one method. The extent of polymerization can also be conveniently monitored, such as by a viscosity endpoint. For instance the resin may be polymerized until, for example, a Gardner-Holt viscosity at 25° C. of about QR is obtained.

Afterward, additional melamine is added to reduce the cumulative F/M mole ratio to about 1.6 to 1.7, preferably about 1.66. The reaction is then allowed to proceed for approximately 15 to 60 minutes, preferably about 30 minutes, and the final sulfonated melamine-formaldehyde resin is cooled to about 20° to 30° C., preferably about 25° C.

The pH of the final resin is adjusted, as necessary, to about 9.0 to 10.0, preferably about 9.3 to 9.7, and more preferably about 9.5.

Water can be added during the reaction or after the resin is prepared so that the ultimate resin contains about 15 to 45%, preferably about 30 to 45%, resin solids.

The sulfonated melamine-formaldehyde resin may then be stored at room temperature or used promptly. The resin has a specific gravity of 1.0 to 1.3, generally has at most 25% to 50% non-volatiles (solids), has a boiling point of approximately 100° C., has a free formaldehyde content of 0.05 wt % to 0.5 wt %, and has a Gardner Holt viscosity of A to G.

The alkaline condition of the reaction media is maintained or adjusted by adding a base or a mixture of bases such as those well known to those of skill in the art. For example, on the basis of cost and performance, an alkali metal hydroxide, such as sodium, lithium or potassium hydroxide, is preferred. Other bases include alkali metal carbonates such as sodium carbonate and potassium carbonate, alkaline earth hydroxides such as magnesium hydroxide, calcium hydroxide and barium hydroxide, and aqueous ammonia.

Although melamine is specifically mentioned, in the practice of this invention, and is preferably used, the melamine may be totally or partially replaced with other aminotriazine compounds. Other suitable aminotriazine compounds include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1 to 6 carbon atoms and, preferably 1 to 4 carbon atoms. Typical examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1–2 phenyl radicals and, preferably, 1 phenyl radical. Typical examples of aryl-substituted melamine are monophenyl melamine or diphenyl melamine.

Any of the cycloaliphatic guanamines also can be employed in the practice of this invention. Preferably, the cycloaliphatic guanamines should not have more than 15 carbon atoms. Typical examples of some of the cycloaliphatic guanamines are tetrahydrobenzoguanamine, hexahydrobenzoguanamine, 3-methyl-tetrahydrobenzoguanamine, 3-methyl-hexahydrobenzoguanamine, 3,4-dimethyl-1,2,5,6-tetrahydrobenzoguanamine, and 3,4-dimethylhexahydrobenzoguanamine and mixtures thereof. A preferred cycloaliphatic guanamine is tetrahydrobenzoguanamine. Mixtures of aminotriazine compounds include melamine and an alkyl-substituted melamine, such as dimethyl melamine, or melamine and a cycloaliphatic guanamine, such as tetrahydrobenzoguanamine.

Formaldehyde can be used alone or in combination with generally a minor amount of any of the aldehydes or their equivalents heretofore employed in the formation of melamine resins including, for example, acetaldehyde, propionaldehyde, butylaldehyde, furfuraldehyde, and benzaldehyde. In general, the aldehydes employed have the formula R'CHO wherein R' is a hydrogen or hydrocarbon radical generally of 1 to 8 carbon atoms. Ordinary formaldehyde is preferred for most applications. Formaldehyde can be supplied in any one of its commonly available forms including formalin solutions and paraformaldehyde. Formaldehyde is generally used as a solution, with a concentration of about 30% to 50% formaldehyde.

Additives typically used in melamine-formaldehyde resins also may be added to the inventive resin, for example fire retardants, pigments, extenders, fillers, and the like. It is within the skill of the art to add appropriate additives as required for particular resin qualities depending on the application.

In accordance with the present invention, the sulfonated melamine-formaldehyde resin may be used in a binder in thermal insulation, such as fiberglass pipe insulation. The sulfonated melamine-formaldehyde resin provides antipunk characteristics to the insulation. Binders generally also include a phenol-formaldehyde resin, urea and melamine.

The tensile strength properties of the cured resin of the present invention are particularly suitable for pipe insulation due to the rigidity requirements of this type of insulation.

Typically, the resin is dissolved in water and applied to the insulation along with any other desired additives. After the binder is cured, it provides a low moisture absorption and a high tensile strength to the insulation.

Binders useful for pipe insulation, for example, also can be prepared with melamine crystals as an additional nitrogen source (and antipunk) along with the sulfonated melamine-formaldehyde resin. To prepare this type of binder, the melamine crystals are dissolved in hot water. Melamine crystals will normally precipitate out of solution when the solution is cooled to room temperature. However, it has been observed that when the sulfonated melamine-formaldehyde resin made in accordance with the present invention is added to the solution, the resin stabilizes the dissolved melamine crystals and prevents the melamine from precipitating after cooling to room temperature.

The sulfonated melamine resin of the present invention provides significantly lower methanol emissions from insulation manufacturing plants during cure than commercially available methylated melamine resins.

The resin, in accordance with the present invention, has improved storage stability. It remains both liquid and infinitely water-soluble for a long period of time, e.g. greater than 50 days, at a wide range of storage temperatures, e.g. 5° C. to 35° C. No waste methanol distillate is made during manufacture which either has to be recycled or incinerated. It's lower final viscosity makes it easier to pump into binder mix tanks.

EXAMPLES

The invention will be further described by reference to the following examples. These examples should not be construed in any way as limiting the invention.

Example 1

| Chemical | Concentration | Moles | Weight % |
| --- | --- | --- | --- |
| Formaldehyde | 50% | 5.0 | 15.0 |
| Water | 100% | 36.6 | 33.3 |
| Sorbitol | 70% | 0.3 | 3.9 |
| Sodium hydroxide | 50% | 0.02 | 0.09 |
| Melamine | 100% | 2.0 | 12.6 |
| Sodium metabisulfite | 100% | 0.3 | 3.1 |
| Water | 100% | 28.0 | 25.5 |
| Melamine | 100% | 1.0 | 6.4 |
| Sodium hydroxide | 50% | 0.001 | 0.005 |

A formaldehyde-melamine resin having about a 1.7 F/M mole ratio was made using sodium metabisulfite and sorbitol to stabilize the resin and improve water solubility characteristics. The formaldehyde, water, and sorbitol were added to a reaction kettle. The solution was adjusted to a pH of 10.0 with 50% NaOH. The solution was then heated to 55° C. A first melamine charge was added so that the initial mole ratio of formaldehyde to melamine was about 2.5. The mixture was heated to 90° C. and held at 90° C. for 30 minutes to methylolate the melamine. The solution was then cooled over 15 minutes to 75° C. The sodium metabisulfite was added at 75° C. The solution was held at 75° C. for 120 minutes to sulfonate the melamine. Next, the solution was heated to 90° C. to polymerize the resin. The solution was held at 90° C. until the Gardner-Holt viscosity at 25° C. was about QR. This took about 330 minutes at 90° C. A second water charge and a second melamine charge then were added to the resin. The final mole ratio of formaldehyde to melamine was about 1.7. The second charge of melamine was allowed to react for 30 minutes, then the resin was cooled to 25° C. The resin pH was adjusted to 9.5 with 50% NaOH. The resulting resin should be stored at or below room temperature (approximately 25° C.) to maximize storage life. The resin had a shelf life of at least 2 months. The resin's water dilutability was >50:1, and its solids content (3 hrs, 105° C., 1–2 g sample size) was 31%.

Example 2

| Chemical | Concentration | Moles | Weight % |
| --- | --- | --- | --- |
| Formaldehyde | 50% | 2.9 | 22.0 |
| Water | 100% | 19.0 | 43.5 |
| Sucrose | 70% | 0.1 | 5.2 |
| Melamine | 100% | 1.0 | 16.0 |
| Sodium bisulfite | 100% | 1.0 | 13.2 |

An about 2.9 mole ratio formaldehyde-melamine resin was made using sodium bisulfite and sucrose to stabilize the resin and add water solubility characteristics. The formaldehyde, water, and sucrose were added to the reaction kettle. The solution was adjusted to a pH of 10.0 with 50% NaOH. The solution was then heated to 55° C. The melamine charge was added at 55° C. The mixture was heated to 90° C. and held at 90° C. for 30 minutes to methylolate the melamine. The solution was then cooled in 15 minutes to 75° C. The sodium bisulfite was added at 75° C. The solution was held at 75° C. for 120 minutes to sulfonate the melamine. Next, the solution was heated to 90° C. to polymerize the resin. The solution was held at 90° C. for 415 minutes. The resin pH was adjusted to 9.5 with 50% NaOH. The resulting resin should be stored at or below room temperature (approximately 25° C.) to maximize storage life. The resin exhibited a shelf life of >6 months, a water dilutability >50:1, and a solids content (3 hrs, 105° C., 1–2 g sample size) of 43%.

Example 3

The moisture absorption of three thermal insulation pipe binders formulated with melamine-formaldehyde resins of this invention prepared with different amounts of sodium metabisulfite was tested. This was done in order to show the effect of melamine resin salt content on moisture absorption. A premix was prepared by mixing a water-soluble phenol-formaldehyde resin GP2804 and a 40% urea solution. The premix solution was allowed to prereact overnight at room temperature. The binders were prepared by weighing the premix, water, additional 40% urea, 28% ammonia, the melamine resin, and silane A1102 coupling agent available from Dow Chemical Co. into a 1 gallon container and mixing well. Glass batts were coated with the binder and cured in a press at 425° F. for 10 minutes. The batts were dried in an oven at 110° C. for 10 minutes and weighed on a top-loading balance to the nearest 0.01 gram. The batts were placed randomly in a humidity cabinet at 120° F. with 95% relative humidity for 5 days. After conditioning, the batts were removed and placed immediately inside tared ziplock plastic bags. The batts were weighed. The % Moisture Absorption was calculated as follows:

$$\% \text{ Moisture Absorption} = \frac{\text{Wet Weight} - \text{Dry Weight} * 100}{\text{Dry Weight}}$$

The results, showing the effect of the degree of sulfonation of this melamine resin on moisture absorption, are plotted in FIG. 1.

Example 4

Figure 2:
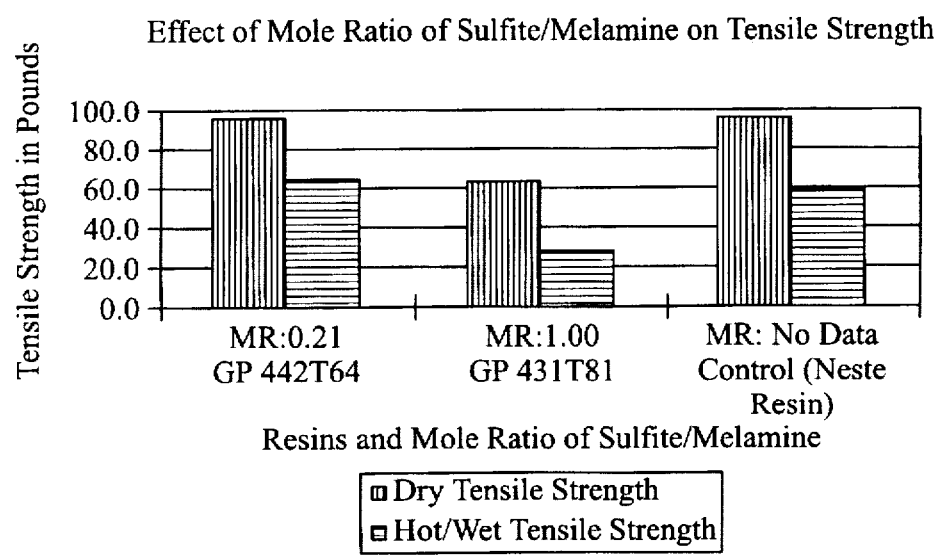
FIG. 2 depicts the effect of mole ratio of sulfite/melamine on tensile strength.

The tensile strength of two thermal insulation pipe binders formulated with melamine resins of this invention prepared with different levels of sodium metabisulfite was tested. This was done in order to assess the tensile strength of the finished product. A control resin was also tested by preparing a binder using a commercially-available melamine resin supplied by Neste. The Neste resin is a water-based methylated melamine resin without any urea modification having a F/M mole ratio of about 3.4. Premixes were prepared by mixing a water-soluble phenol-formaldehyde resin GP415T15 and a 40% urea solution. The premix solutions were allowed to react overnight at room temperature. Binders were prepared from the premix by weighing the premix, water, additional 40% urea, 28% ammonia, the melamine resin, and silane A1102 coupling agent into a one-quart jar and mixing well. Handsheets were prepared by sprinkling the binder onto a glass matt, vacuuming the excess binder off of the glass, and curing the sheet in an oven at 425° F. for 3 minutes. Dry tensiles were measured by breaking the handsheets in a tensile tester. Hot/wet tensiles were measured by soaking the handsheets in water at 185° F. for 10 minutes and then breaking them in a tensile tester while they were still hot and wet. The results are shown in FIG. 2 and the table below.

| Resin | Mole Ratio Sodium Bisulfite/Melamine | Dry Tensile Strength | Hot/Wet Tensile Strength |
| --- | --- | --- | --- |
| Example 1 | 0.21 | 96.1 | 64.3 |
| Example 2 | 1.00 | 62.3 | 25.7 |
| Control | None | 94.5 | 56.0 |

Example 5

Figure 3:
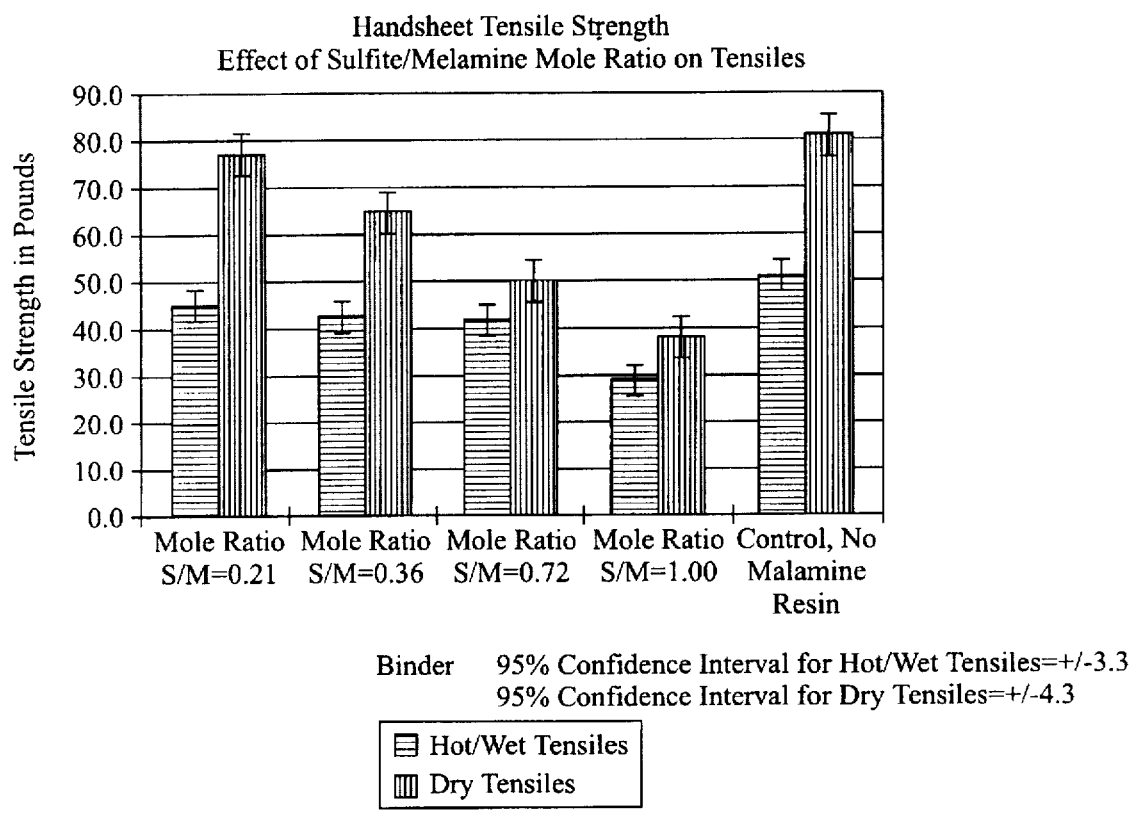
FIG. 3 depicts handsheet tensile strength effect of sulfite/melamine mole ratio on tensiles.

The handsheet tensile strength of four thermal insulation pipe binders formulated with melamine resins prepared with different levels of sodium metabisulfite was tested. This was done in order to illustrate the effect of the sulfite/melamine mole ratio on the tensile strength of thermal pipe insulation made using the sulfonated resin. A control was also tested by preparing a binder without any melamine resin. Premixes were prepared by mixing resin GP 2804 and a 40% urea solution. The premix solution was allowed to prereact overnight at room temperature. The binders were prepared by weighing the premix, water, additional 40% urea, 28% ammonia, the melamine resin, and silane A1102 coupling agent into a one-quart jar and mixing well. Handsheets were prepared by sprinkling the binder onto a glass matt, vacuuming the excess binder off of the glass, and curing the sheet in an oven at 425° F. for 3 minutes. Dry tensiles were measured by breaking the handsheets in a tensile tester. Hot/wet tensiles were measured by soaking the handsheets in water at 185° F. for 10 minutes and then breaking them in a tensile tester while they were still hot and wet. The results are shown in FIG. 3 and the table below.

| In Melamine Resin on Handsheet Tensile Strength | | |
| --- | --- | --- |
| Mole Ratio of Sulfite/Melamine In Melamine Resin | Dry Tensile Strength | Hot/Wet Tensile Strength |
| Control, No Melamine Resin | 81.8 | 51.9 |
| 0.21 | 77.4 | 45.2 |
| 0.36 | 65.4 | 43.0 |
| 0.72 | 50.5 | 42.3 |
| 1.00 | 38.6 | 29.5 |

95% Confidence Interval for Dry Tensile Strength = +/- 4.3 lbs.
95% Confidence Interval For Hot/Wet Tensile Strength = +/- 3.3 lbs.

Example 6

Figure 4:
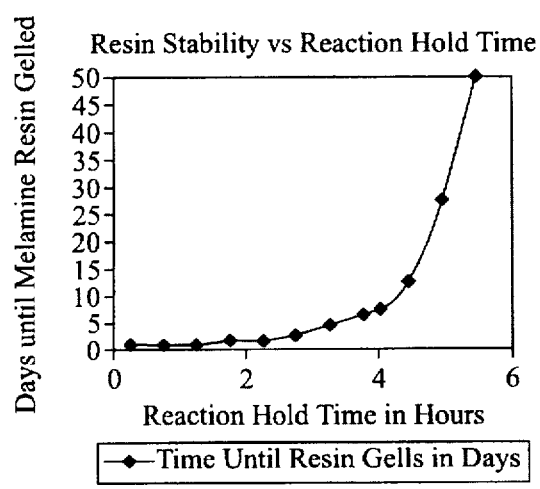
FIG. 4 depicts resin stability vs reaction hold time results.

The melamine resin of example 2 was prepared as usual. During the hold at 90° C., samples were taken at various times, cooled to room temperature, and monitored for gelation in Gardner Holt Viscosity tubes. The resin was considered gelled when the viscosity tube was turned upside down and the air bubble would not move through the resin. The appearance of the resin at this point was similar to Jello® gelatin. FIG. 4 shows that the first twelve samples all gelled within about two months. The final sample, which was held for 7 hours, is still liquid after 378 days at room temperature.

Example 7

Figure 5:
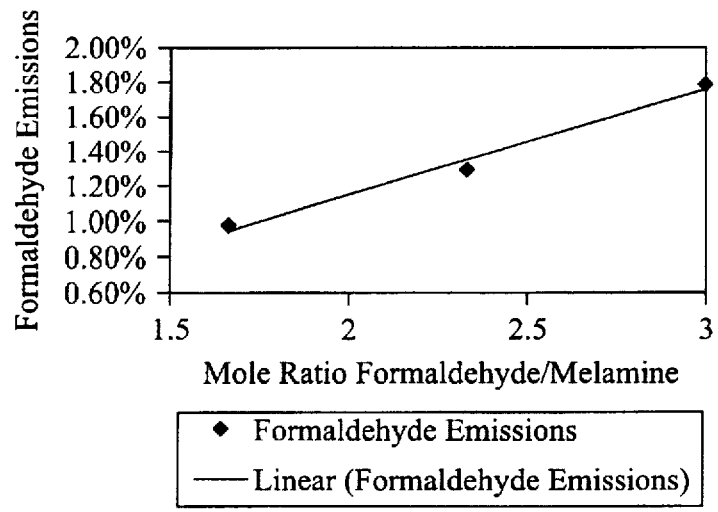
FIG. 5 depicts formaldehyde emissions vs mole ratio of formaldehyde/melamine results.

Three melamine resins were prepared with three different mole ratios of formaldehyde/melamine. Pipe binders were prepared using these three melamine resins. The formaldehyde emissions of each of these binders was tested using the tube furnace method to determine the amount of formaldehyde emissions from each. The emissions test was done as follows. A premix was prepared by mixing resin GP 2804 and a 40% urea solution. The premix solution was allowed to prereact overnight at room temperature. The binders were prepared by weighing the premix, water, additional 40% urea, 28% ammonia, the melamine resin, and silane A1102 coupling agent into a one-quart jar and mixing well. The binder was weighed onto a glass filter paper in a glass sample boat to the nearest 0.1 mg. The sample boat was transferred to the tube furnace and cured at 200° C. for 10 minutes. The air from the tube furnace was sparged through a 0.25% solution of dinitrophenhydrazine (DNPH). The DNPH solution was analyzed on the HPLC using a diode array detector to quantify the formaldehyde hydrazone as a percent of binder solids. The results are shown in the table below and in FIG. 5.

| Mole Ratio Formaldehyde/Melamine | % Formaldehyde Emissions |
| --- | --- |
| 1.66 | 0.98% |
| 2.33 | 1.29% |
| 3.00 | 1.78% |

Example 8

Figure 6:
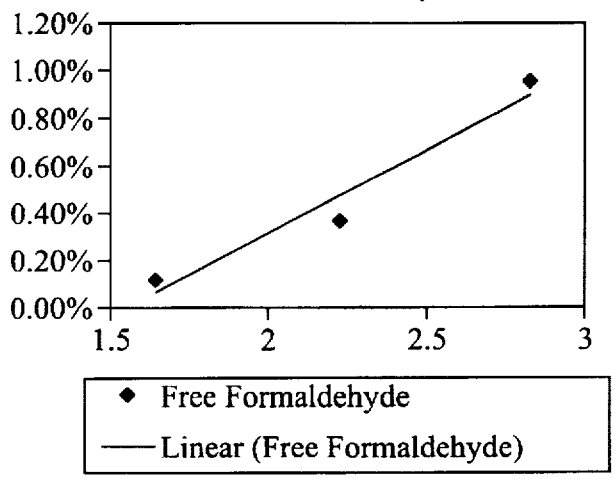
FIG. 6 depicts free formaldehyde in resins vs mole ratio of formaldehyde/melamine results.

Three melamine resins were prepared with three different mole ratios of formaldehyde/melamine. After preparation, the free formaldehyde content of each of the resins was measured using the sulfite test method. The results are shown in FIG. 6 and the table below.

| Mole Ratio Formaldehyde/Melamine | % Free Formaldehyde |
| --- | --- |
| 1.66 | 0.12% |
| 2.33 | 0.38% |
| 3.00 | 0.98% |

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A water-soluble sulfonated melamine-formaldehyde resin prepared by reacting melamine and formaldehyde at an initial F/M mole ratio of about 2.0 to 3.0 in the presence of a polyhydroxy compound and under an alkaline condition to form an initial melamine-formaldehyde resin;

sulfonating the initial resin with sodium bisulfite or metabisulfite;

polymerizing the sulfonated melamine-formaldehyde resin by heating;

adding additional melamine to reduce the cumulative F/M mole ratio to about 1.6 to 1.7 and produce a final sulfonated melamine-formaldehyde resin; and adjusting the pH of the final resin, as necessary, to about 9.0 to 10.0, wherein sufficient sodium bisulfite or metabisulfite is added to provide a bisulfite/melamine mole ratio of about 0.05 to 1.5 based on the total amount of melamine.

2. The resin of claim 1, wherein the polyhydroxy compound is sucrose or sorbitol.

3. The resin of claim 1, wherein the polyhydroxy compound/melamine ratio is about 0.06 to 0.18 based on the total amount of melamine.

4. The resin of claim 1, wherein the bisulfite/melamine mole ratio is about 0.15 to 1.0.

5. The resin of claim 4, wherein the bisulfite/melamine mole ratio is about 0.15 to 0.8.

6. The resin of claim 5, wherein the bisulfite/melamine mole ratio is about 0.15 to 0.25.

7. The resin of claim 6, wherein the bisulfite/melamine mole ratio is about 0.21.

8. The resin of claim 1, wherein the F/M mole ratio is about 2.3 to 2.7.

9. The resin of claim 1, wherein the sulfonated melamine-formaldehyde resin is polymerized by heating to about 85° to 95° C.

10. A method of producing a water-soluble sulfonated melamine-formaldehyde resin comprising reacting melamine and formaldehyde at an initial F/M mole ratio of about 2.0 to 3.0 in the presence of a polyhydroxy compound and under an alkaline condition to form an initial melamine-formaldehyde resin;

sulfonating the initial resin with sodium bisulfite or metabisulfite;

polymerizing the sulfonated melamine-formaldehyde resin by heating;

adding additional melamine to reduce the cumulative F/M mole ratio to about 1.6 to 1.7 and produce a final sulfonated melamine-formaldehyde resin; and adjusting the pH of the final resin, as necessary, to about 9.0 to 10.0, wherein sufficient sodium bisulfite or metabisulfite is added to provide a bisulfite/melamine mole ratio of about 0.05 to 1.5 based on the total amount of melamine.

11. The method of claim 10, wherein the polyhydroxy compound is sucrose or sorbitol.

12. The method of claim 10, wherein the polyhydroxy compound/melamine ratio is about 0.06 to 0.18 based on the total amount of melamine.

13. The method of claim 10, wherein the bisulfite/melamine mole ratio is about 0.15 to 1.0.

14. The method of claim 13, wherein the bisulfite/melamine mole ratio is about 0.15 to 0.8.

15. The method of claim 14, wherein the bisulfite/melamine mole ratio is about 0.15 to 0.25.

16. The method of claim 15, wherein the bisulfite/melamine mole ratio is about 0.21.

17. The method of claim 10, wherein the F/M mole ratio is about 2.3 to 2.7.

18. The method of claim 10, further comprising heating the sulfonated melamine-formaldehyde resin to about 85° to 95° C.

19. Thermal insulation treated with a binder containing a water-soluble sulfonated melamine-formaldehyde resin prepared by dissolving the resin in water and applying to the thermal insulation; wherein the resin is prepared by reacting melamine and formaldehyde at an initial F/M mole ratio of about 2.0 to 3.0 in the presence of a polyhydroxy compound and under an alkaline condition to form an initial melamine-formaldehyde resin;

sulfonating the initial resin with sodium bisulfite or metabisulfite;

polymerizing the sulfonated melamine-formaldehyde resin by heating;

adding additional melamine to reduce the cumulative F/M mole ratio to about 1.6 to 1.7 and produce a final sulfonated melamine-formaldehyde resin; and adjusting the pH of the final resin, as necessary, to about 9.0 to 10.0, wherein sufficient sodium bisulfite or metabisulfite is added to provide a bisulfite/melamine mole ratio of about 0.05 to 1.5 based on the total amount of melamine.

20. The thermal inulation of claim 19, wherein the binder also contains phenol-formaldehyde resin, melamine and urea.

* * * * *